United States Patent [19]

Cederquist

[11] Patent Number: 4,535,412
[45] Date of Patent: Aug. 13, 1985

[54] DRIVETRAIN TORQUE DETERMINATION USING TORQUE CONVERTER CHARACTERISTICS

[75] Inventor: Alf L. Cederquist, Ann Arbor, Mich.

[73] Assignee: Ford Motor Company, Dearborn, Mich.

[21] Appl. No.: 319,156

[22] Filed: Nov. 6, 1981

[51] Int. Cl.³ .................... G01L 3/00; G01L 5/12; G06F 15/20
[52] U.S. Cl. .................. 364/511; 73/117.4; 364/424.1; 364/565
[58] Field of Search ............... 74/866, 752 D; 377/47; 73/118, 117.4; 364/424.1, 511, 565; 340/52 F

[56] References Cited

U.S. PATENT DOCUMENTS

| | | | |
|---|---|---|---|
| 3,600,563 | 8/1971 | Porter et al. | 377/47 |
| 3,673,391 | 6/1972 | Lougheed | 377/47 |
| 3,680,370 | 8/1972 | Muller-Berner | 73/118 |
| 3,686,935 | 8/1972 | May | 73/118 |
| 3,832,640 | 8/1974 | Cederquist et al. | 377/47 |
| 3,922,910 | 12/1975 | Dickinson | 73/118 |
| 4,008,567 | 2/1977 | Hirsch | 364/424.1 |
| 4,036,190 | 7/1977 | Bigliani et al. | 364/511 X |
| 4,166,440 | 9/1979 | Helava et al. | 73/118 |
| 4,320,381 | 3/1982 | Olivier | 340/52 F |
| 4,323,976 | 4/1982 | Radaelli et al. | 364/565 |
| 4,361,060 | 11/1982 | Smyth | 74/866 |

*Primary Examiner*—Felix D. Gruber
*Attorney, Agent, or Firm*—Frank G. McKenzie; Donald J. Harrington

[57] ABSTRACT

A system for determining the instantaneous torque produced by an engine or motor that drives on automotive vehicle powertrain through a hydrodynamic torque converter. A digital circuit operates to generate a binary number, which is the count of high frequency pulses that are a multiple of the frequency of the engine crankshaft occurring between the pulses that are proportional to the speed of the driveshaft. The speed ratio control elements of the transmission are controlled by the state of pressure solenoids that actuate hydraulic valves. The state of the pressure solenoids is used to determine the speed ratio of the transmission; changes in state indicate the onset of a period of instability during which the transmission components are undergoing transition to a new speed ratio. This transition is sensed by the circuit and a signal indicative of the transiency or constancy of the pressure solenoids is transmitted to the computer. An overflow of the binary number in the counters in excess of a predetermined number is sensed by the circuit and transmitted to the computer. Either of these conditions will cause the computer to discount the number within the counters. Otherwise, the count is used as a basis upon which the speed ratio and capacity factor of the torque converter are determined and the torque of the engine calculated.

6 Claims, 8 Drawing Figures

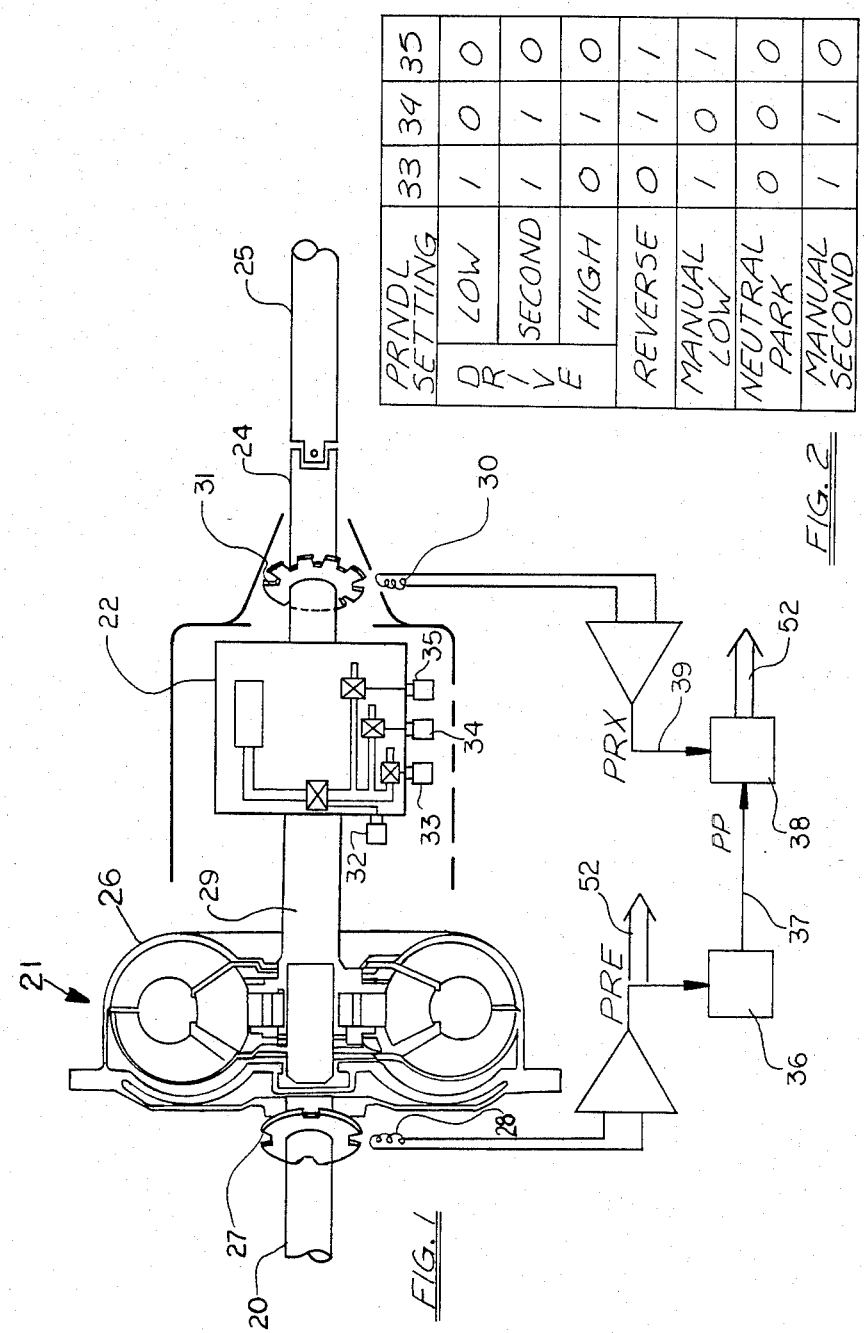

4,535,412

DRIVETRAIN TORQUE DETERMINATION USING TORQUE CONVERTER CHARACTERISTICS

BACKGROUND OF THE INVENTION

1. Field of the Invention

This invention is related to systems employing electronic digital computers for determining the torque applied by a power producing device to a torque converter and other components of an automotive drivetrain. More particularly, the present invention is related to the field of digital circuits that process information indicative of the instantaneous operating characteristics of the drivetrain and adapt it for use by a computer in determining the various torques. More particularly still, the invention pertains to such digitial circuits wherein transient operation of an automatic transmission, excessive disparity in the speeds of several shafts of the drivetrain and other operating conditions are sensed, transmitted to the computer and used to confirm the acceptability of data or to discount the data produced by the circuits in the computations made by the computer.

2. Description of the Prior Art

In the operation of an automatic transmission, the determination of the shift points and control of the line pressure that actuates the clutch elements in the planetary gear set require that the operating characteristics of the engine and of the transmission be accurately known. Control systems for automatic transmissions that are based on hydraulic fluid logic or electronically controlled logic employ various indirect indications of the instantaneous operating characteristics of the engine and of the transmission. These indications with reference to U.S. patents in which they are described include: vehicle speed and accelerator pedal displacement (U.S. Pat. Nos. 3,732,754 and 4,034,627); throttle valve setting (U.S. Pat. Nos. 3,733,930 and 4,082,013); transmission output shaft torque (U.S. Pat. Nos. 4,031,782 and 4,106,368); output shaft speed (U.S. Pat. No. 4,027,554); sungear acceleration (U.S. Pat. No. 3,719,096); turbine torque, turbine acceleration and instantaneous gear ratio (U.S. Pat. No. 3,752,011); slip rate of the torque converter (U.S. Pat. No. 3,640,152); manifold pressure and torque converter slippage (U.S. Pat. No. 3,693,479); and output torque of the engine in combination with the torque on the stator of the torque converter (U.S. Pat. No. 3,799,001). Fluid circuit logic used to control operation of an automatic transmission employs pressure levels as a measure of the rotational speed of critical components of the transmission. For example, governor pump pressure is used as a measure of the speed of the output shaft of the transmission. Precise knowledge of the torque at various locations in the drivetrain is essential for optimum control of the transmission.

For example, it is preferable to know exactly the torque produced by the engine throughout the full range of its operation. In an automatic transmission the engine drives the planetary gear sets through a torque converter whose impeller is driven from the engine and whose turbine drives the transmission, the impeller and turbine being driveably connected through a hydrodynamic flow path. Because of the packaging limitations required in an automotive vehicle, it is difficult to determine with accuracy the power or torque delivered by the engine although the speed of the engine crankshaft can be readily deduced.

The operating characteristics of a hydrodynamic torque converter are fairly well established. For example, the relationship between the torque of the turbine and the impeller torque is a well established function of the speed ratio of the shafts on which each of these are mounted. Similarly, the torque converter capacity factor defined as the ratio of the speed of the impeller to the square root of the torque of the impeller is known to vary in accordance with well established principles according to variations of the speed ratio of the torque converter. The rotational speeds of the several shafts that connect the driveshafts of the vehicle with the engine crankshaft are generally easily determined by using information concerning operation of the torque converter. Shaft speed can be used to accurately determine torque delivered from the engine and torque at various locations along the drivetrain.

SUMMARY OF THE INVENTION

The system according to this invention for determining the instantaneous torque delivered to the transmission torque converter by the engine includes a first magnetic pick-up mounted on the engine crankshaft that induces a current in a first circuit and produces a pulse train whose frequency is proportional to the speed of the crankshaft. A torque converter has its impeller driven from the engine crankshaft and drives the transmission gear set through the turbine shaft. Clutch and brake elements of the transmission, which when actuated produce the various speed ratios of the transmission, are controlled through the operation of pressure solenoids. A second magnetic pick-up fixed to the output shaft of the transmission produces a pulse train having a frequency that is proportional to the speed of the driveshaft.

A circuit acts in response to the signal pulse derived from the engine crankshaft to produce a high frequency signal that is a multiple of the signal pulse. A digital circuit counts the number of high frequency pulses that occur between successive pulses of the pulse train that indicate the speed of the output shaft. The digital circuit senses the present state and the next state of the pressure solenoids and operates to produce an interrupt data signal received by an electronic computer that indicates the equality of the instantaneous state and the former state of the pressure solenoids. This signal when received by the computer allows the binary number within the counter to be used in programmed logic. When the instantaneous states and former states of the pressure solenoids are not equal, the computer will discount the binary number present in the counter. The digital circuit has means for determining an excess number of high frequency signal pulses occuring in the interval between successive output shaft pulses. When such an overflow occurs the digital circuit operates to produce an overflow signal received by the computer. The receipt of this signal causes the computer to discount the then present count existing in the counters.

The main computational program is entered as a result of an interrupt signal. The programmed logic permits the speed ratio of the torque converter to be calculated from the binary number within the counters. From the speed ratio or a converted value of the speed ratios stored in the computer memory, the torque converter instantaneous torque ratio and instantaneous capacity factor are determined. These values are used by the computer with a corresponding engine speed to determine engine torque, output shaft torque and turbine torque.

BRIEF DESCRIPTION OF THE DRAWINGS

FIG. 1 is a schematic drawing of the pertinent elements of the drivetrain of a motor vehicle equipped with an automatic gear change transmission.

FIG. 2 is a truth table indicating the state of the pressure switches corresponding to the several gear ratios at which the transmission may operate.

DESCRIPTION OF THE PREFERRED EMBODIMENT

Figure 3:
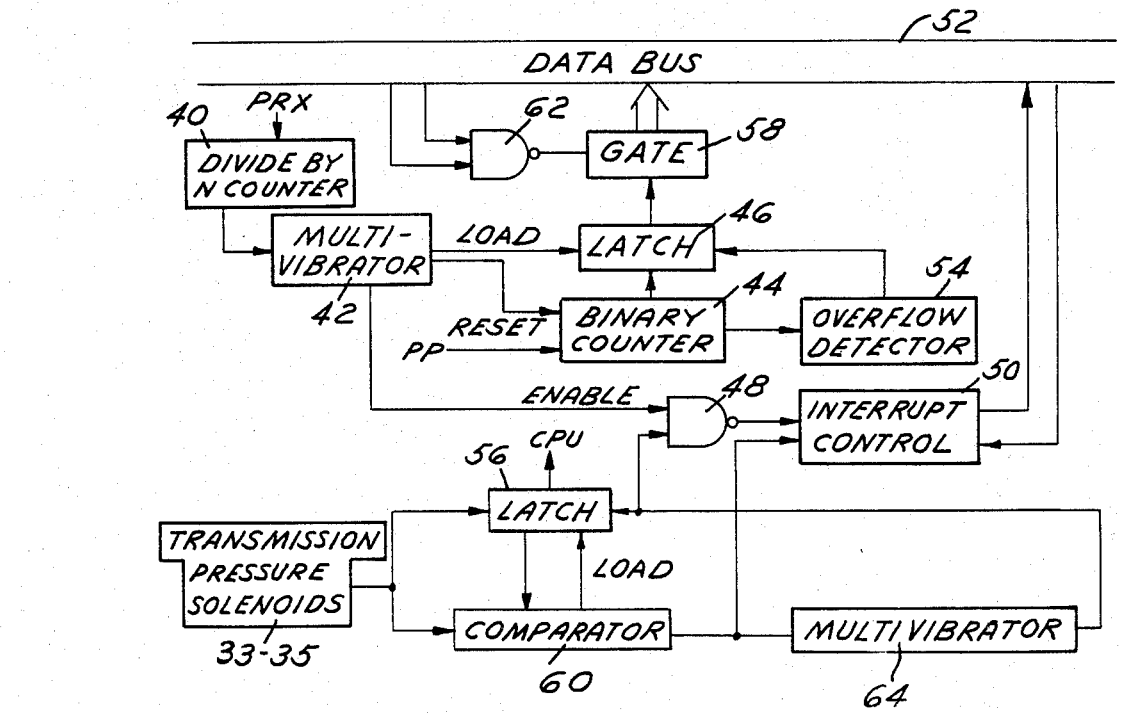
FIG. 3 illustrates a block diagram of an electronic circuit according to the present invention.

The principal elements of the drive train for a motor vehicle equipped with an automatic power transmission are shown in FIG. 1. The engine crankshaft 20 drives an automatic transmission 22 whose output shaft 24 is directly connected to the driveshaft 25, which transmits power to the wheels of the vehicle through a differential. The crankshaft is driveably connected to the impeller 26 of a torque converter 21. A damper plate 27 fixed to the crankshaft has four equally spaced notches machined on its circumference and produces an engine reference pulse PRE when the zero crossing of the current induced in coil 28 is detected as the center of each notch passes the coil 28. Similarly, a disk 31 rotating with the transmission output shaft 24 has eight notches formed on its circumference. A second magnetic pickup has a coil 30 in which current is induced and a transmission reference pulse PRX produced as each notch of disc 31 passes coil 30. Engine crankshaft or impeller speed, NP, is calculated by the computer from the period of the reference pulses induced in coil 28.

Figure 4:
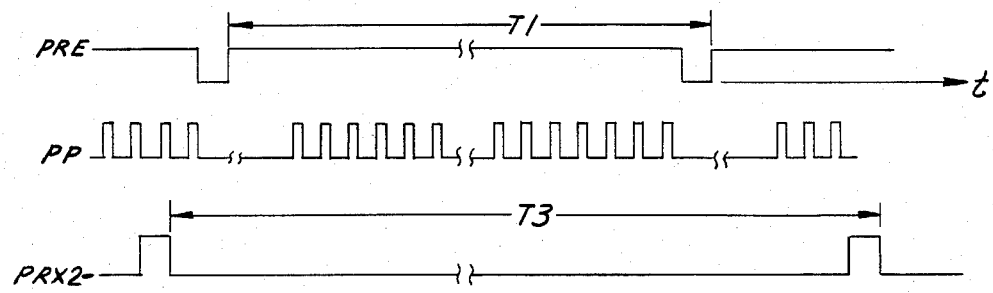
FIG. 4 illustrates a series of signal waveform diagrams which illustrate the operation of the circuit of FIG. 5.

The signal waveform diagrams of FIG. 4 illustrate the timed relationship of the engine reference pulse PRE, whose period is T1, with respect to the transmission reference pulse PRX, whose period is T3. The period T1 will vary as the engine speed varies; the period T3 depends upon engine speed and the gear ratio in which transmission 22 is operating. A circuit and method are described in U.S. Pat. No. 3,832,640, the entire disclosure of which is incorporated herein by reference, for generating an output signal having a frequency which is a selected multiple of a variable input signal frequency. A circuit 36 operating according to the principles of that invention receives the PRE waveform as an input signal and produces an output signal PP whose frequency is selected to be 256 times the frequency of PRE. Reference pulses PP are considered to be present when the reference signal is low.

Signals PRX and PP are used as input in circuit 38, whose structure and function is described herein, to produce a binary number that is transmitted to the central processing unit of a computer wherein the binary number and other selected parameters of the drive train are used to calculate the speed ratio of the torque converter, engine torque and transmission output torque.

A variable force solenoid 32 actuates the throttle valve that regulates the line pressure of the hydraulic control circuit of transmission 22. Hydraulic pressure is applied to and removed from the pistons of the various clutch and brake components of the transmission by pressure valves that are operated by solenoids 33-35. The ON-OFF state of the solenoids determines the speed ratio at which the transmission operates. By selectively actuating the solenoids, the transmission can produce its full range of drive ratios and by decoding the state of the solenoids the instantaneous operating ratio can be determined. The truth table of FIG. 2 indicates the relationship between the state of the solenoids and the gear ratio selected by the vehicle operator.

The various speed ratios at which the PRNDL selector switch can be set by the vehicle operator is shown in FIG. 2 in comparison to the state of the three solenoids, the on-state being indicated by a 1, the off-state by a O.

Referring now to FIG. 3, the operation of the system schematically illustrated there will be described. The transmission reference pulses PRX produced as each notch of wheel 31 passes coil 30 are supplied to a binary divide-by-N counter 40 whose output is transmitted to a multivibrator 42. A cascade arrangement of four-bit binary counters 44, upon receiving a RESET signal from the multivibrator, counts the PP signals generated by the circuit 36. The multivibrator 42 generates a load signal for latch 46 and produces an ENABLE pulse for NAND gate 48, which drives an interrupt control circuit 50 upon receiving the output pulse from a multivibrator 64. The application of the RESET pulse to binary counter 44 operates to set the output of the counter to zero preparatory to receiving PP pulse signals which are then counted. The count continues until counter 44 receives a RESET pulse from multivibrator 42, which indicates the occurence of the next PRX pulse produced by the dividing counter 40. Subsequent application of the LOAD signal to latch 46 causes the latch to register the number then present in the binary counter and to store that number for later reference. This binary number together with other information from overflow detector 54 and latch 56 is transmitted via gate 58 on data bus 52 which carries the information to the computer for processing.

The instantaneous state of the hydraulic pressure valve solenoids 33-35 is transmitted to a latch 56 and to a comparator 60 wherein the equality or inequality between the instantaneous state and the former state of the pressure solenoids is determined. Latch 56 receives a LOAD signal from comparator 60 by way of multivibrator 64. This signal permits the instantaneous state of the switches 33-35 to enter the latch 56. If a difference exists between the present and previous state of the pressure solenoids at the time of the occurrence of the PPX pulse that terminates the count of PP pulses in the binary counter, the comparator output operates to transmit a pause interrupt signal to the computer through the operation of the interrupt control 50. The effect of this is to cause the count in the register of binary counter 44 to be disregarded by the computer because of the inherent inaccuracy in the count as indicated by the pause interrupt. This inaccuracy is the result of a change in state of the pressure solenoids resulting from a gear change within the transmission. A delay period is required to stabilize the transmission at the selected gear ratio, the delay taking approximately 0.8 seconds. This delay is caused by the need for the transmission components to move from the previous gear ratio condition to the selected gear ratio condition. During this period of instability the speed ratio of the transmission is in transition; consequently the count in latch 46 should not be used as input data for use with the algorithm stored within the programmed logic in the computer memory. For this reason, the data acquired during the period between PRX pulses following an inequality indicated by comparator 60 is discounted.

Unless the comparator indicates an instability in the transmission, the interrupt control 50 produces a data interrupt signal to the computer at the end of the data acquisition period indicating that data is ready for transmittal to the computer. An acknowledge signal issuing from the computer upon receipt of the data and transmitted via the data bus clears the pause interrupt and data interrupt status existing within the interrupt control 50.

Figure 5:
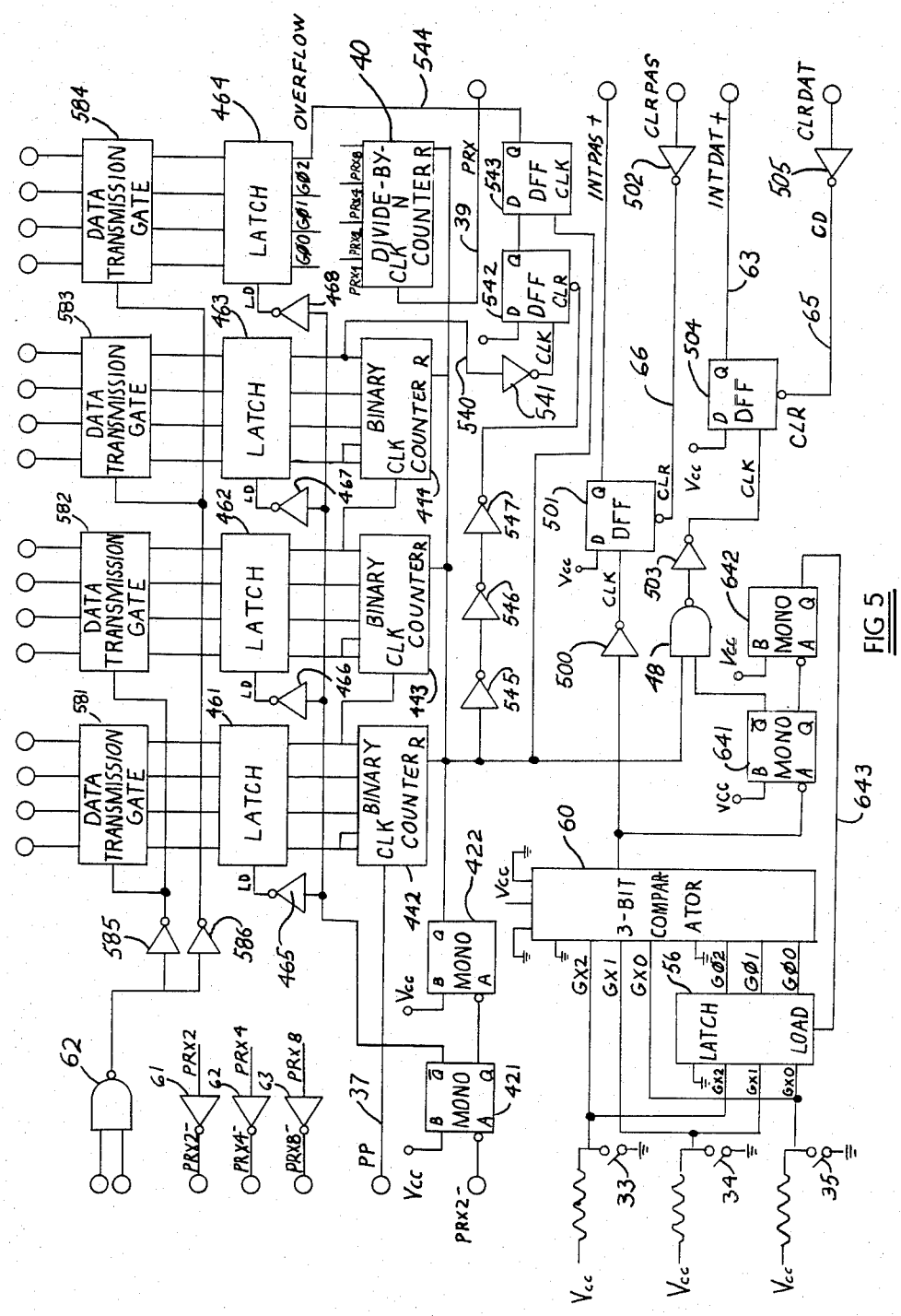
FIG. 5 illustrates a circuit diagram which corresponds to the block diagram of FIG. 3 but which has substituted for certain of the blocks of the FIG. 1 diagram the necessary integrated circuit components.

Referring now to the digital circuit diagram of FIG. 5, the PRX pulses representing a measure of the speed of the transmission output shaft 24 are transmitted from magnetic pick-up 30 on conductor 39 to the clock terminal of the divide-by-N counter 40. Binary counter 44 actually includes three four-bit binary counters 442, 443 and 444. These counters, available from Texas Instruments, Inc. as integrated circuit packages 7493, are adapted to respond to the removal of an input signal, i.e., to the low-going edge of the PP pulses, which initiates the count function, and to the application of a positive pulse on another pin which resets the counter. Binary counters 442-444 generate a twelve-bit binary word representing the number of PP pulses occuring during the interval between the occurrences of successive PRX pulses. This binary word is applied as the input signal to storage latches 461, 462, 463 which receive, store and nondestructively read out the binary word. The latches may be integrated circuit packages 7475 and are available from Texas Instruments, Inc.

Data transmittal commands from the computer carried on the data bus are received as input in NAND gate 62 whose output is applied to data transmission gates 581, 582, 583, 584 after having been inverted by inverters 585 and 586. When the transmission gates receive a transmit data signal from gate 62, data from the latches is transferred to the data bus and is carried thereon to the computer. The data word generated in the cascaded binary counters has twelve bits, which permits 4095 PP pulses to be counted between each occurrence of a PRX pulse. The binary counters have capacity for overflow of the most significant bit if more than 4095 PP pulses occur during the PRX interval. An overflow signal is transmitted to the overflow detector 54, which operates to transmit an overflow signal to latch 464 from which it is transferred to the transmission gate 584 and from there to the computer upon the occurrence of a transmit data signal emanating from NAND gate 62.

The PRX pulses are carried on conductor 39 from the magnetic pick-up coil 30 and are applied as input to the clock terminal of counter 40. The counter is available from Texas Instruments, Inc. as an integrated circuit able to produce multiple output signals each having a frequency that is the frequency of the PRX signal divided by various powers of two from zero through three. The outputs having lower frequencies than PRX, represented as pulses PRX2, PRX4, PRX8, are transmitted respectively to inverters 61, 62, 63 which invert the signal and produce pulses PRX2-, PRX4-, PRX8-. The output of inverter 61 has, therefore, a frequency equal to one-half the frequency of PRX. In this way, one PRX2 pulse is produced for every quarter revolution of the transmission output shaft 24 though there were eight notches formed on the plate 31. Similarly, one PRE pulse is produced for every quarter turn of engine crankshaft 20.

The output of inverter 61 is applied to the A terminal of monostable multivibrator 421 whose Q output is connected to the A terminal of a second monostable multivibrator 422. Multivibrators 421 and 422 are available from Texas Instruments, Inc. as 74123 integrated circuit packages. The multivibrators have their B terminals connected to a source of positive control voltage identified as VCC and each has a pulse width of 100 nanoseconds. The inverted Q output of multivibrator 421 is connected to inverters 465-468, which produce the signals that load the latches 461-464, respectively. The Q output terminal of multivibrator 422 is connected to the reset terminal of binary counters 442-444, to the clear terminal of D flip-flop 542, the clock terminal of D flip-flop 543 and an input terminal of NAND gate 48.

The overflow detector 54 includes D flip-flops 542 and 543, which may be Texas Instruments, Inc. integrated circuit package 7474. Flip-flop 542 is adapted to generate a high-going signal when the count in binary counter 444 exceeds the capacity of the counter. Overflow from counter 444 is the most significant bit representing the number of PP pulses occuring in the PRX interval. Overflow occurs when the most significant bit of counter 444 returns to a binary zero after having been a binary one, provided there has been no RESET pulse applied to the counter from multivibrator 422. Flip-flop 542 has its D input connected to a source of positive control voltage. The clock input of flip-flop 542 is connected to the output of inverter 541, which inverts the binary value appearing on the most significant bit output lead 540 from counter 444. Therefore, the clock input of flip-flop 542 receives a high-going transition signal when an overflow bit issues from binary counter 444. If the CLEAR pulse has not been applied to flip-flop 542, the occurrence of the overflow bit causes a positive signal to appear at the Q output of flip-flop 542 and at the D input of flip-flop 543. Following the occurrence of the overflow bit emanating from counter 444, the next pulse produced by multivibrator 422 is applied as the clock pulse to flip-flop 543 thereby causing its next state to be a high carried on lead 544 to the input of latch 464. The overflow bit is then loaded within latch 464 upon the next occurence of the load pulse produced by multivibrator 421. In this way, the overflow bit is associated with the count of binary counter 444 and with the particular PRX2- period during which this count was made.

The CLEAR pulse from multivibrator 422 that next follows the occurence of the overflow bit is applied at the clear terminal of flip-flop 542 but delayed with respect to the CLEAR pulse that is applied at the clock terminal of flip-flop 543. The delay is the result of propagation delay associated with inverters 545-547. This delay assures that flip-flop 542 will not be cleared until the overflow bit is first transmitted to the D terminal of flip-flop 543 when multivibrator 422 next goes high. A low output produced by inverter 547 is received by flip-flop 542 as a high-going transition because its clear terminal is an inverting input terminal. If an overflow bit does not issue from binary counter 444, the pulse received at the clear terminal of flip-flop 542 operates to set the Q output of the flip-flop low. Thereafter, the clear pulse generated by one-shot 422 is applied to the clock input of flip-flop 543, thus the Q output of flip-flop 543 is transmitted to latch 464 indicating that no overflow has occured. If, however, overflow does occur, the overflow bit remains stored in flip-flop 543 until the output of inverter 547 produces a low signal at the inverting clear input of flip-flop 542.

The present or instantaneous ON-OFF states GX0,GX1,GX2 of the pressure solenoids 33–35 is applied to the input of a three-bit comparator 60 and a latch 56. The comparator has three additional input terminals connected to the output of latch 56. Comparator 60 produces a high voltage pulse output when the input states are equal and a low voltage output when they are not equal. The output of comparator 60 is connected to the A input of monostable multivibrator 641. The B terminal is connected to a source of positive control voltage, VCC. The inverted output of multivibrator 641 is connected to one input terminal of NAND gate 48; the other input is connected from the Q output of multivibrator 422. The Q output of multivibrator 641 is connected to the A input terminal of a second monostable multibrator 642 whose input terminal B is similarly connected to the source of positive control voltage. The Q output terminal of multivibrator 642 is connected to the load input terminal of latch 56. The pulse width of multivibrator 601 is approximately one second; the pulse width of multivibrator 642 is approximately one hundred nonoseconds.

An inverter 503 provides the clock pulse for D flip-flop 504 upon receiving the output pulse from NAND gate 48. Flip-flop 504 produces a high output after the clock signal is received because its D terminal is connected to the source of positive control voltage. When D flip-flop 504 goes high, the pulse indicates a data interrupt, which is transmitted on line 63 to data bus 52 for transmission to the computer. The computer acknowledges receipt of the data interrupt through an inverter 505 whose output is carried to the clear terminal of flip-flop 504 via lead 65.

A pause interrupt signal is produced at the output terminal of D flip-flop 501 when a positive-going pulse is received at the clock terminal from inverter 500 when comparator 60 indicates inequality. The output of flip-flop 501 is carried on the data bus to the computer. An acknowledgement of receipt of the pause interrupt is carried on conductor 66 through inverter 502 from the data bus.

The pulse width of monostable multivibrator 641 being approximately one second is sufficiently long to allow the hydraulically actuated components of the transmission to stablilize following a gear ratio change. A gear ratio change is indicated by the change of state of at least one of pressure solenoids 33–35 as indicated by the truth table of FIG. 2. When the output of comparator 60 goes high, indicating an equivalence between the instantaneous state of the pressure switches and the previous state that is stored in latch 56, the inverting output terminal of one-shot 641 goes high approximately onesecond after the output from the comparator is produced. When the RESET signal is produced by one-shot 422 upon the occurrence of the PRX2 pulse, NAND gate 48 goes low and the output of inverter 503 goes high. This pulse, applied to the clock input of flip-flop 504, operates to transmit the data interrupt signal to the computer. This signal indicates that the count recorded within binary counter 44, which count has been loaded into latch 46 for transmission to the data bus through transmission gates 58, is to be processed by the computer.

If the instantaneous state of the pressure switches becomes different from the state existing within latch 56, comparator 60 goes low, the output of inverter 500 goes high and a pause interrrupt signal issuing from flip-flop 501 is transmitted to the computer. The occurrence of the pause interrupt indicates that the gear ratio of the transmission is changing and that the binary count of the PP pulses next to become available to the computer upon the occurrence of the succeeding PRX2 pulse is not to be processed. When comparator 60 goes low, the trailing edge of the pulse received at the A terminal of multivibrator 641 causes its Q output to go high and the inverted terminal output to go low. Therefore, when the RESET signal is produced by multivibrator 422, NAND gate 48 goes low and flip-flop 504, which is cleared following the last data interrupt signal, produces a low output. The Q output of multivibrator 641 is applied to the A input of multivibrator 642 whose D output then goes high.

This output operates to load latch 56 with the new state of pressure switches 33–35. When equality is indicated at the output of comparator 60, the interrupt data signal is transmitted to the computer upon each occurence of a PRX2 pulse. When inequality is indicated by the comparator, the interrupt data signal is not produced, instead the pause interrupt signal is produced by flip-flop 501. This pause interrupt causes the data to be discounted by the computer. The entire package of information together with information concerning the state of pressure solenoids 33–35 is transmitted to the computer by way of the data transmission gates 581–584 and the data bus.

The torque converter speed ratio required by this system for the determination of engine torque is derived from the twelve-bit binary number, C, obtained from the electronic circuitry described with respect to FIGS. 3, 4, and 5. The valve of C is equal to the number of PP pulses occurring during the period required for one-quarter revolution of the transmission output shaft 24. Let T1 be the time required for a quarter revolution of crankshaft 20, T2 the time for a quarter revolution of the torque converter turbine shaft 29 and T3 the time for one quarter revolution of the output shaft 24. The torque converter speed ratio, S, is the ratio of the speeds of the impeller or crankshaft 20 to the turbine shaft 29, i.e., S=T1/T2=NT/NP, where NT is the speed of the turbine shaft and NP is the speed of the crankshaft. The ratio of the speed of output shaft 24, TOS, to the speed of turbine shaft 29, is the transmission speed ratio, G, which has a discrete value for each of the gear ratios at which the transmission may operate. Consequently, G=T3/T2=TOS/NT.

Circuit 36 has been adapted to produce 256 PP pulses during period T1 regardless of its duration. Therefore, the number of PP pulses occuring between each PRX2-pulse is C=256×T3/T1=256×G×(T2/T1).

Since the torque converter speed ratio, S, equals T1/T2

$$S = 256 \times G/C; \quad 0 \leq C \leq 4095.$$

The upper limit of the value of C due to its twelve bit length is 4095. An overflow condition is flagged when C equals or exceeds 4096 indicating that the count C cannot be used for a valid calculation during the period T3. When this overflow occurs, $$S(\text{overflow}) = (256/4096) \times G = 0.0625, 0.0911, 0.1536$$

for the high, intermediate and low gear ratios, respectively, for which the corresponding speed ratios, G, are 1.00, 1.457 and 2.457.

The relationship between torque converter impeller torque, TP, and impeller speed, NP, is used to define the torque converter capacity factor, K(S)

$$K(S) = NP/\sqrt{TP}$$

where the variable S is the torque converter speed ratio. For a given value of S this ratio is constant for all values of engine torque and speed, these being equal to impeller torque and speed. The capacity factor is a fundamental physical property of the fluid momentum transfer between the impeller and turbine.

The ratio of the torque converter turbine torque, TT, to the impeller torque, TP, is defined as $$T(S) = TT/TP.$$

Figure 6A:
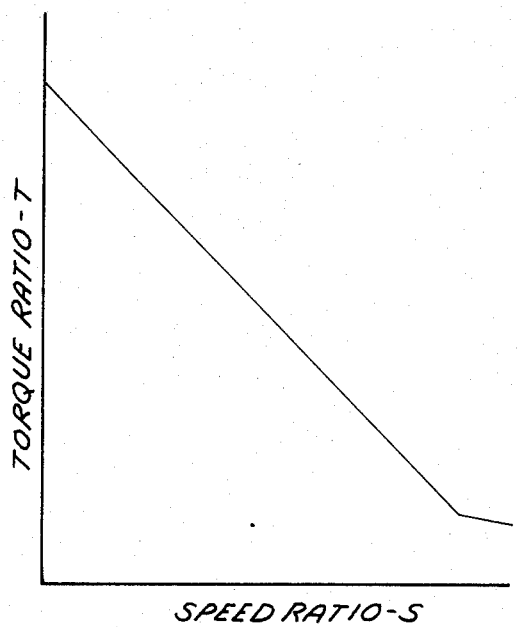
FIG. 6A is a graph that illustrates the variation of the torque converter torque ratio, T(S), with the speed ratio, S.
Figure 6B:
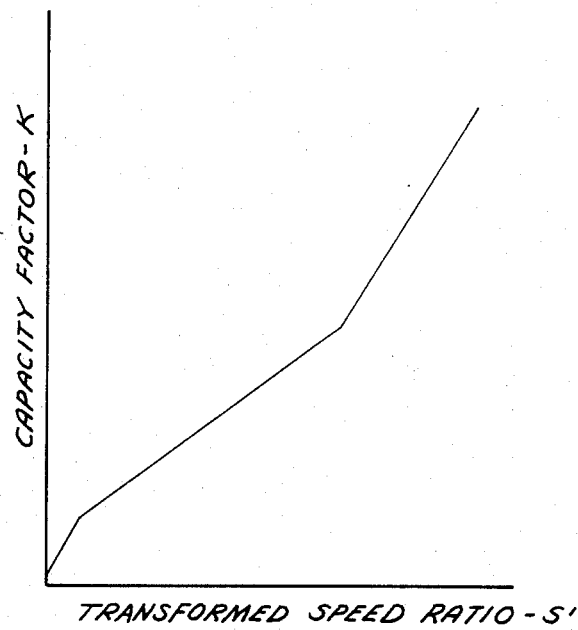
FIG. 6B is a graph that illustrates the variation of the torque converter capacity factor, K, with the transformed speed ratio, S'.

It has been found that by transforming the torque converter speed ratio, S, to a different variable, S', defined as $S' = 1/(1-S)$, the capacity factor varies according to the transformed speed as shown in FIG. 6B. When the relationship between the capacity factor and the transformed speed ratio, S', is presented in this way, a piecewise linear variation can be seen having two intermediate break points. The torque ratio, T, varies with the speed ratio, S, in two piecewise linear segments having one intermediate break point as shown in FIG. 6A. These characteristic relationships of the capacity factor and the torque ratio with S' and S are stored in computer memory in a look-up table which comprises the ordinate and abscissa values of the intermediate break points and the points at the extremities of the characteristic curves of FIGS. 6A and 6B.

Similarly, the binary word corresponding to the instantaneous state of the pressure solenoids is stored in computer memory in a look-up table having the values of the transmission speed ratio that correspond to the state of the solenoids 33–35. The computer program includes interpolation routines for determining the values of the capacity factor and the torque ratio from a value of the speed ratio given as input.

Figure 7:
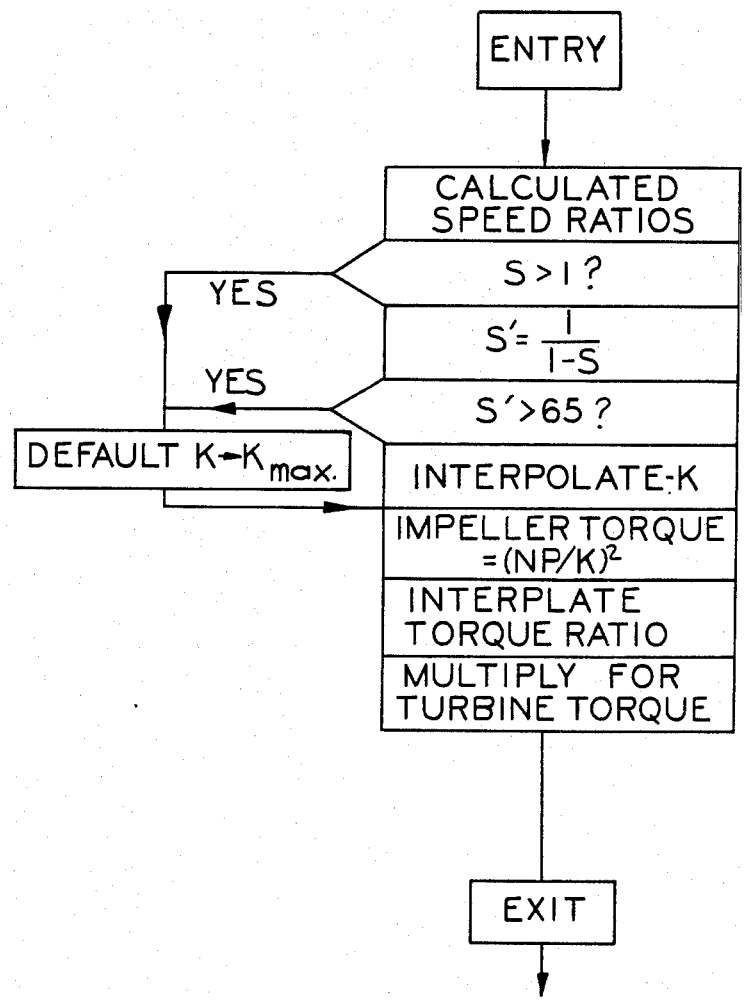
FIG. 7 is a computer flow chart illustrating the sequence of operations used to determine the operating characteristics of the drive system of FIG. 1.

The computer program is outlined with respect to FIG. 7. Normally entry is made at the speed ratio calculation having as input data the binary number, C, produced by the circuit of FIG. 5; the transmission speed ratio, G, determined from the look-up tables; and the binary number indicating the instantaneous state of the pressure solenoids 33–35. If the speed ratio is greater than unity, which corresponds to a deceleration condition, the default branch is taken and K is set equal to K max. Otherwise, the transformed speed ratio, S', is calculated from S. If a coast condition exists, as would be indicated by the value for the transformed speed ratio exceeding 65, the default branch is taken and the capacity factor K is set equal to its maximum value.

If neither default branch is taken, the capacity factor, K, is determined by interpolating intermediate values of K from the coordinates of the break points and terminal points of FIG. 6B in the look-up tables given the value for S' last calculated. The torque converter impeller torque TP is then calculated from the defining equation for the capacity factor, $$TP = (NP/K)^2.$$

This value is stored for use in a later step of the program wherein torque converter turbine torque is calculated. The torque converter torque ratio, T(S), is obtained using a linear interpolation routine to find intermediate values for the torque ratio given the value of the speed ratio. The torque converter turbine torque TT is then calculated from $$TT = TP \times T(S).$$

The torque of output shaft 24 may be determined from the calculated value of turbine torque TT and the transmission speed ratio $$TOS = TT \times 1/G.$$

The calculated values may be read from the computer to an output device or used to control operation of the drive system after proper conversion by a digital-to-analog voltage converter.

Having described a preferred embodiment of my invention, what I claim and desire to secure by U.S. Letters Patent is:

1. In a system for determining the torque produced by a power generating device that drives a crankshaft and the torque applied to other components of a powertrain driven by the device comprising:

a torque converter having an impeller drivably connected to the crankshaft and a turbine driven from the impeller whose speed and torque may vary from those of the impeller;

an automatic transmission drivably connected to the turbine by a turbine shaft and to an output shaft, capable of producing multiple ratios, G, of the rotational speed of the output shaft to the speed of the turbine shaft in accordance with the ON-OFF state of pressure solenoids that activate and deactivate speed ratio control elements of the transmission;

means for sensing the state of the pressure solenoids and for determining from that state the speed ratio at which the transmission is operating;

first means for producing a first signal having a frequency that is proportional to the variable speed of the crankshaft;

second means for producing a second signal having multiple successive pulses whose frequency is proportional to the speed of the output shaft;

means for producing a high frequency signal having a frequency that is a selected multiple, M, of the frequency of the first signal;

first counter means operative to receive and count the number, C, of high frequency signal pulses occurring between successive second signal pulses; and means for repetitively computing the impeller speed, NP, from the frequency of the first signal, the speed ratio, S, of the torque converter from the relationship $S = M \times G/C$ and the crankshaft torque, TP, from the relationship $TP = (NP/K)^2$, the computing means being provided with a data base that includes the values of the capacity factor, K, of the torque converter that corresponds to the computed values of the speed ratio of the torque converter, the computer impeller speed, the number C, and the transmission ratio, G, corresponding to the state of the pressure solenoids.

2. The system of claim 1 wherein the computing means is provided with a data base that further includes the values of the torque ratio, T, of the torque converter that corresponds to the speed ratio range of the torque converter within which the system operates, and wherein the computing means determines the torque ratio of the torque converter corresponding to the calculated speed ratio of the torque converter and calculates the turbine torque, TT, from the equation $TT = T \times TP$.

3. The system of claim 1 wherein the computing means calculates the torque of the output shaft, TOS, from the equation $TOS = TT/G$.

4. A method for determining the torque applied to various components of a powertrain that includes a power generating device, which drives the impeller of a torque converter through a crankshaft, a turbine of the torque converter driven by the impeller whose speed and torque may differ from those of the impeller, an automatic transmission driven by the turbine through a turbine shaft and delivering power through its output shaft, capable of producing multiple ratios, G, of the speed of the output shaft to the speed of the turbine shaft and having speed ratio control elements for establishing the operating speed ratios that are activated and deactivated according to the state of pressure solenoids, and a computer provided with a data base that includes the values of the capacity factor, K, of the torque converter that correspond to the operating speed ratio range of the torque converter, comprising the steps of:

sensing the instantaneous state of the pressure solenoids and determining from that state the speed ratio, G, of the transmission corresponding thereto;

producing a first signal having a frequency that is proportional to the speed of the crankshaft;

producing a second signal having multiple successive pulses whose frequency is proportional to the speed of the output shaft;

producing a high frequency signal having a frequency that is selected multiple, M, of the first signal;

counting the number, C, of high frequency signal pulses occuring between successive second signal pulses;

repetitively calculating the speed ratio, S, of the torque converter from the relationship $S = M \times G/C$;

repetitively calculating the speed of the impeller, NP, from the frequency of the first signal;

repetitively determining the capacity factor of the torque converter corresponding to the calculated speed ratio;

repetitively calculating the impeller torque, TP, from the relationship $TP = (NP/K^2)$; and controlling the operation of the transmission using the calculated impeller torque.

5. The method according to claim 4 wherein the computing means is provided with a data base that further includes the values of the torque ratio, T, of the torque converter corresponding to the speed ratio range of the torque converter within which it operates, comprising the additional steps of repetitively determining the torque ratio of the torque converter corresponding to the calculated speed ratio of the torque converter and repetitively calculating the turbine torque, TT, from the relationship $TT = T \times TP$.

6. The method of claim 4 comprising the additional step of repetitively calculating the torque of the output shaft, TOS, from the relationship $TOS = TT/G$.

* * * * *